United States Patent
Kumada et al.

(10) Patent No.: US 8,390,213 B2
(45) Date of Patent: Mar. 5, 2013

(54) LED POWER-SOURCE CIRCUIT AND ILLUMINATION FIXTURE USING THE SAME

(75) Inventors: Kazuhiro Kumada, Himeji (JP); Yoshifumi Kuroki, Moriguchi (JP); Hiromitsu Mizukawa, Suita (JP)

(73) Assignee: Panasonic Corporation, Osaka (JP)

(*) Notice: Subject to any disclaimer, the term of this patent is extended or adjusted under 35 U.S.C. 154(b) by 317 days.

(21) Appl. No.: 12/697,187

(22) Filed: Jan. 29, 2010

(65) Prior Publication Data

US 2010/0231138 A1    Sep. 16, 2010

(30) Foreign Application Priority Data

Jan. 30, 2009   (JP) .................. 2009-020698

(51) Int. Cl.
*H05B 37/02* (2006.01)

(52) U.S. Cl. .................. 315/291; 315/224; 315/247

(58) Field of Classification Search .................. 315/224, 315/247, 291, 294, 297
See application file for complete search history.

(56) References Cited

U.S. PATENT DOCUMENTS

| | | | |
|---|---|---|---|
| 5,465,029 A * | 11/1995 | Hanazaki et al. ............. | 315/308 |
| 6,577,512 B2 * | 6/2003 | Tripathi et al. ............. | 363/21.17 |
| 7,378,805 B2 * | 5/2008 | Oh et al. ................... | 315/291 |
| 2002/0158590 A1 * | 10/2002 | Saito et al. ................ | 315/291 |
| 2008/0136350 A1 * | 6/2008 | Tripathi et al. ............. | 315/294 |
| 2008/0278092 A1 * | 11/2008 | Lys et al. .................... | 315/247 |
| 2009/0079355 A1 * | 3/2009 | Zhou et al. .................. | 315/246 |
| 2009/0296387 A1 * | 12/2009 | Reisenauer et al. .......... | 362/235 |
| 2011/0012526 A1 * | 1/2011 | Kelly ........................... | 315/247 |

FOREIGN PATENT DOCUMENTS

JP   2008130438   5/2008

* cited by examiner

*Primary Examiner* — Tung X Le
(74) *Attorney, Agent, or Firm* — Waddey & Patterson, P.C.; Mark J. Patterson; Gary L. Montle

(57) ABSTRACT

An LED power-source circuit includes an input filter circuit including noise prevention capacitors and a line filter, a diode bridge connected to the input filter circuit, a smoothing capacitor connected to an output of the diode bridge and having a capacitance of 1 μF or less, a DC-DC conversion circuit connected to the smoothing capacitor, and an LED assembly connected to an output of the DC-DC conversion circuit. Grounding capacitors are coupled to ground from an input power line between the line filter and the diode bridge. The total capacitance from the input power line to ground is set to be 1/200 or less of that of the smoothing capacitor.

6 Claims, 4 Drawing Sheets

LED POWER-SOURCE CIRCUIT AND ILLUMINATION FIXTURE USING THE SAME

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-020698, filed Jan. 30, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to LED power-source circuits and lamp fixtures using the same.

Because the performance and longevity of light emitting diodes (LEDs) are steadily improving, general purpose light fixtures using LEDs are being more frequently used in place of more conventional incandescent and fluorescent lamps. This trend is expected to continue. Therefore, there is a need for high efficiency LED power-source circuits using DC-DC conversion.

Prior art LED power-source circuits are known for carrying out full-wave rectification of commercial AC power by using a diode bridge, and further carrying out DC-DC power conversion using a DC-DC conversion circuit and a smoothing capacitor, and then supplying the converted voltage to an LED. Also, such prior art circuits may use a configuration in which a circuit ground of the DC-DC conversion circuit is connected to ground via a ground capacitor. However, optimization of the component values of the smoothing capacitor and the ground capacitor has not been considered in detail.

BRIEF SUMMARY OF THE INVENTION

In an LED power-source circuit having a DC-DC conversion circuit, a noise filter needs to be provided so that a switching noise is not leaked into an input power-source line. Conventionally, noise terminal voltage in an LED lamp fixture tends to increase because of an increase in the number of LEDs. For purpose of noise reduction, a circuit ground of the DC-DC conversion circuit is connected to a lamp fixture ground. However, if the capacitance between the circuit ground and the fixture increases, the ability of the circuit tolerate a surge voltage (common mode) decreases. At the same time, the capacitance has to be selected so as to suppress the noise terminal voltage within a controlled range and simultaneously satisfy surge performance.

In view of the above-mentioned problems, the present invention intends to reduce a high frequency noise propagated to the input power-source line and improve the surge performance in the LED power-source circuit using the DC-DC conversion circuit.

To solve the above-described problems, according to a first aspect of the present invention, an LED power-source circuit includes an input filter circuit having noise prevention capacitors and a line filter, a diode bridge for rectifying an AC input voltage, the diode bridge being connected to the input filter circuit, and a smoothing capacitor for smoothing a pulsating voltage from the diode bridge. The smoothing capacitor is connected to an output of the diode bridge and may have a capacitance of 1•F or less. A DC-DC conversion circuit (such as a step-down chopper circuit) is connected across the smoothing capacitor. An LED assembly is connected to an output of the DC-DC conversion circuit. One or more capacitors are connected to a lamp fixture ground from an input power-source line between the line filter and the diode bridge. The total capacitance from the power-source line to the fixture ground may be set to be 1/2000 or less of that of the smoothing capacitor.

In one embodiment, an LED power-source circuit includes an input filter circuit including noise prevention capacitors and a line filter LF, a full-wave diode bridge for rectifying an AC input voltage, the diode bridge being connected to the input filter circuit. A smoothing capacitor is used to smooth a pulsating voltage, the smoothing capacitor being connected to an output of the diode bridge DB and having a capacitance of 1•F or less. Also included is a DC-DC conversion circuit (such as a step-down chopper circuit) connected to the smoothing capacitor C3, and an LED assembly connected to an output of the DC-DC conversion circuit. The noise prevention capacitors are coupled to a fixture ground from a circuit ground on a DC output side of the diode bridge. The total capacitance from the circuit ground to the fixture ground may be set to be 1/2000 or less of that of the smoothing capacitor.

According to a third aspect of the present invention, the DC-DC conversion circuit may be a step-down chopper circuit.

According to a fourth aspect of the present invention, the DC-DC conversion circuit is a flyback converter circuit.

According to a fifth aspect of the present invention, a lamp fixture includes the LED power-source circuit in a metallic housing.

According to the present invention, in an LED power-source circuit using a DC-DC conversion circuit, high frequency noise propagated to an input power-source line is suppressed and the applied voltage after rectification is suppressed when a common-mode voltage surge is applied, protecting the lamp fixture from damage

DETAILED DESCRIPTION OF THE INVENTION

Figure 1:
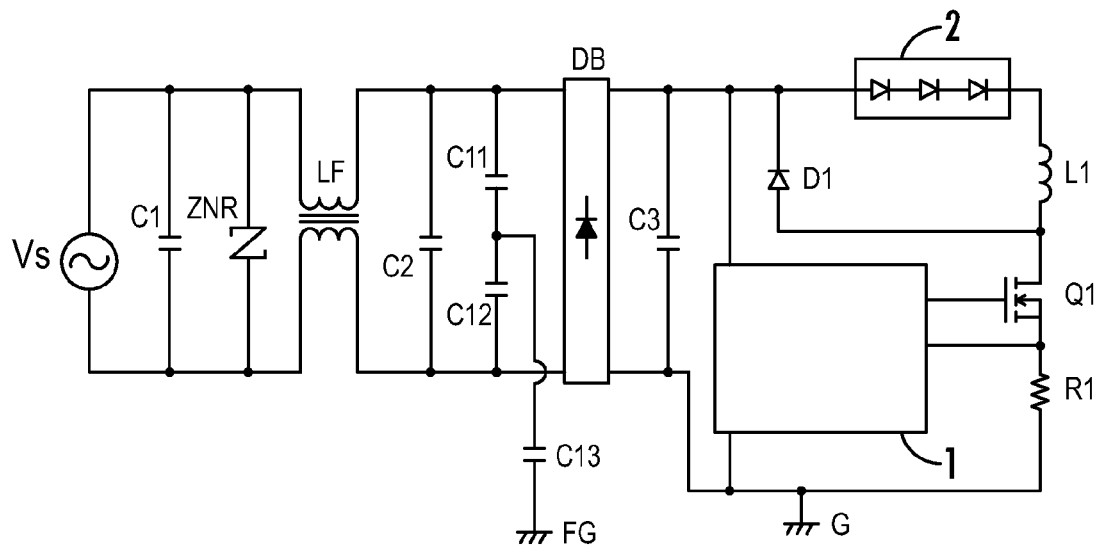
FIG. 1 is a circuit diagram according to a first embodiment of the present invention.

FIG. 1 is a circuit diagram according to a first embodiment of the present invention. An alternating-current (AC) input terminal of a diode bridge DB is connected to a commercial AC power source Vs via a line filter LF. A parallel circuit of a first noise prevention capacitor C1 and a nonlinear resistor element ZNR is connected to a power-source side of the line filter LF. A second noise prevention capacitor C2 is connected to an output terminal of the line filter LF. A series circuit of capacitors C11 and C12 is connected to the noise prevention capacitor C2 in parallel. A connecting node of the capacitors C11 and C12 is connected to an earth ground or fixture ground FG via a capacitor C13.

A smoothing capacitor C3 is connected to a direct-current (DC) output terminal of the diode bridge DB. The smoothing capacitor C3 smoothes the pulsating voltage from the DC output terminal of the diode bridge DB. In one embodiment, the capacitance of the smoothing capacitor C3 is 1•F or less.

A negative electrode of the smoothing capacitor C3 is connected to a circuit ground G. A positive electrode of the smoothing capacitor C3 is connected to the anode side of an LED assembly 2. One end of an inductor L1 is connected to the cathode side of the LED assembly 2. The other end of the inductor L1 is connected to the anode of a diode D1. The cathode of the diode D1 is connected to the anode side of the LED assembly 2. The anode of the diode D1 is connected to the drain electrode of a switching element Q1. In one embodiment, the switching element Q1 is a MOSFET. A current detection resistor R1 is connected between the source electrode of the switching element Q1 and the circuit ground G. An ungrounded terminal of the current detection resistor R1 is connected to a detection terminal of a control circuit 1. The gate electrode of the switching element Q1 is connected to a pulse width modulated (PWM) signal output terminal of the control circuit 1.

The control circuit 1 can be a conventional control integrated circuit (IC) for a switching power-supply, and controls the current to the LED assembly 2 by controlling the on-time and an off-time of the switching element Q1, and monitoring the current detected by the current detection resistor R1. When the switching element Q1 is in an on-state, current passes through a path from the smoothing capacitor C3, the LED assembly 2, the inductor L1, the switching element Q1, the current detection resistor R1, and to the smoothing capacitor C3. The current through the inductor L1 gradually increases, and electromagnetic energy is stored in the inductor L1.

When the switching element Q1 is turned off, the electromagnetic energy stored in the inductor L1 is discharged through a current path from the inductor L1, the diode D1, the LED assembly 2, and to the inductor L1. By repeating this operation at a high frequency, an average current passing through the LED assembly 2 is controlled to a desirable level.

Because the switching element Q1 is switched at a frequency substantially-higher than that of the commercial AC power source Vs, and the capacitance of the smoothing capacitor C3 is small, e.g., 1•F or less (for example, 0.23•F), the input power factor from the commercial AC power source Vs becomes high. On the other hand, leakage of high frequency noise to the input power-source line may become a problem. Consequently, the leakage of high frequency noise to the input power-source line is prevented by providing the line filter LF and the noise prevention capacitors C1 and C2.

In addition, the common mode high frequency noise applied between ground and the input power-source line is reduced by connecting the input power-source line to the fixture ground FG via the capacitors C11 to C13, in a Y-shaped topology. The fixture ground FG can be electrically connected to a metal lamp fixture housing in which the power circuit is contained, and the metal housing can be connected to an earth ground.

Figure 2:
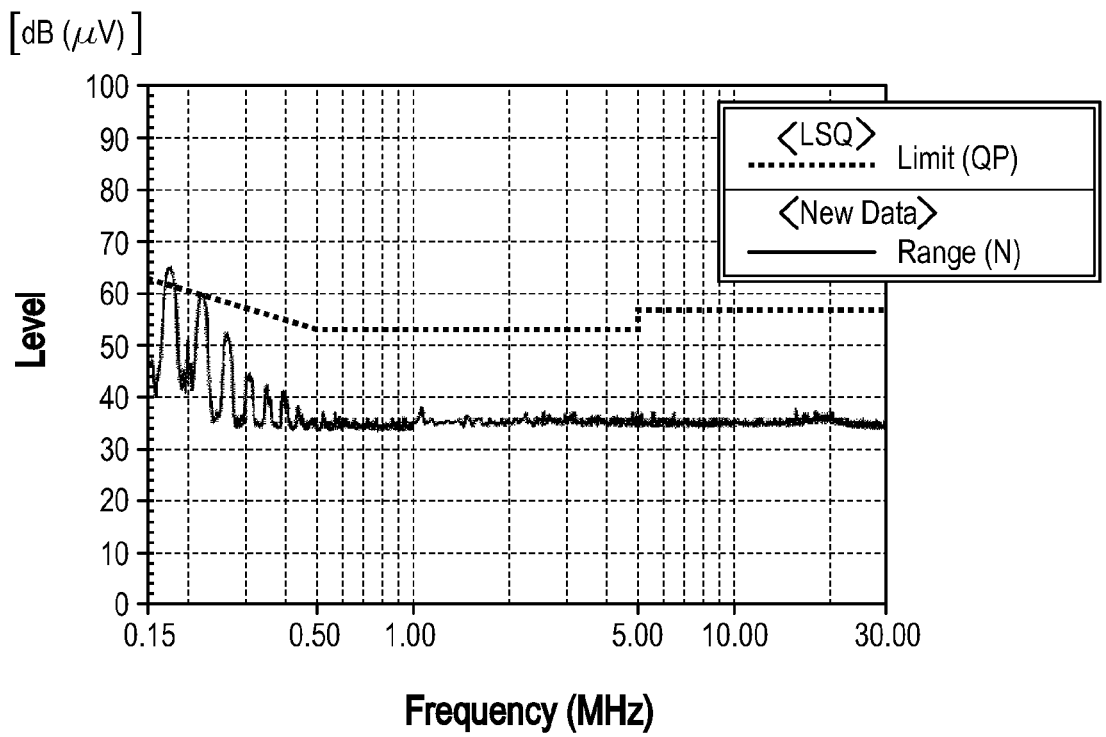
FIG. 2 is a graphical diagram showing measurement of noise terminal voltage in a conventional LED power-source circuit.
Figure 3:
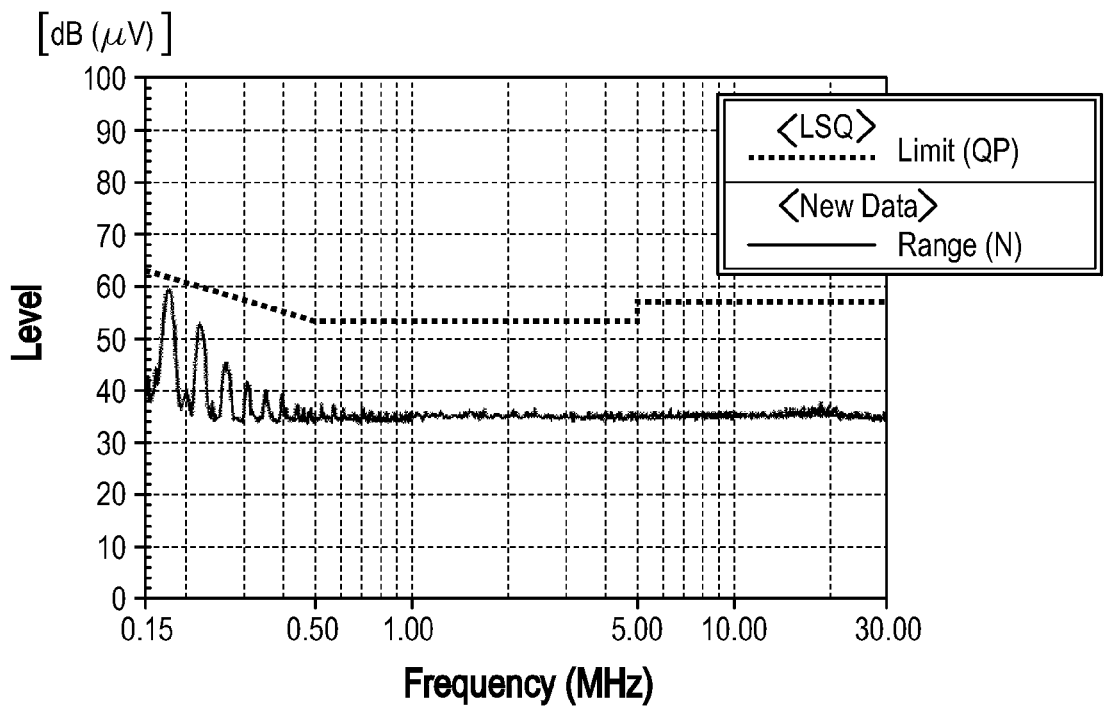
FIG. 3 is a graphical diagram showing measurement of noise terminal voltage in an LED power-source circuit of the present invention.

FIG. 2 shows measurement of a noise terminal voltage level in a circuit where the capacitors C11 to C13 are not employed. FIG. 3 is a measurement result of a noise terminal voltage level in a circuit where the capacitors C11 to C13 are employed. In both cases, the metal lamp housing is connected to ground. In this embodiment, the capacitance of each of the capacitors C11 to C13 is 220 pF, and a capacitance of the smoothing capacitor C3 is 0.23•F.

In FIGS. 2 and 3, the dashed line represents a limit or threshold for desired noise regulation. In the case of FIG. 2 where the ground capacitors C11 to C13 are not employed, noise frequency band exceeds the noise regulation limit. On the other hand, in the case of FIG. 3 where the capacitors C11 to C13 are employed, it is found that the frequency band exceeding the noise regulation limit does not exist.

Figure 4:
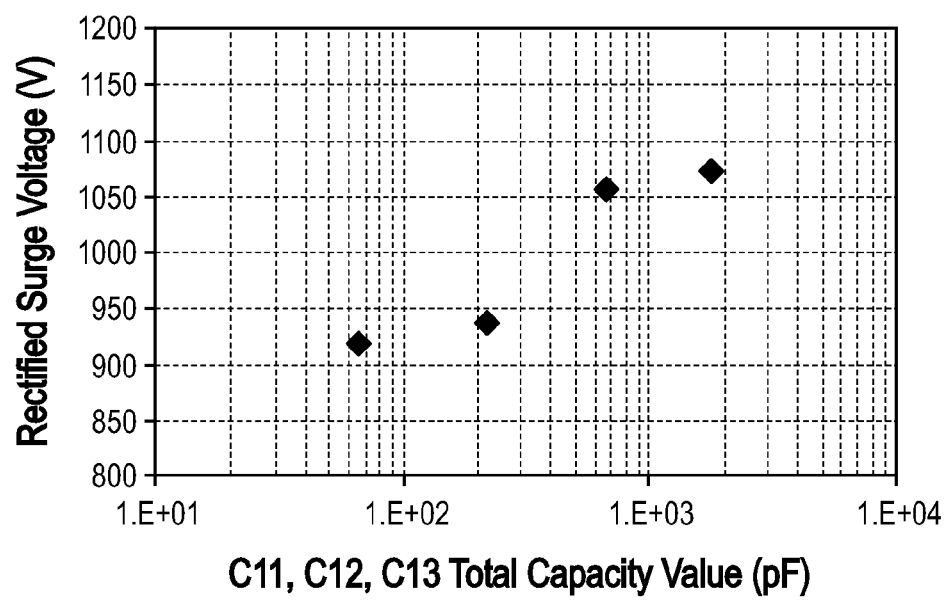
FIG. 4 is a graphical diagram showing measurement of a line surge voltage according to the first embodiment of the present invention.

FIG. 4 shows a measurement of lightning or other line surge voltage after rectification by the diode bridge DB. The horizontal axis indicates total capacitance (pF) of the capacitors C11, C12, and C13. The vertical axis indicates a measurement of a rectified surge voltage (V) in a case where a lightning surge (common mode) (5 kV) is applied. The capacitance of the smoothing capacitor C3 is 0.23•F.

Referring to FIG. 4, when the total capacitance of the ground capacitors C11 to C13 is less than 300 to 500 pF, the lightning surge voltage appears to be dramatically improved. However, the scale of the vertical axis is enlarged in practice and accordingly it can be said that the improvement is within a range of a measurement error (dispersion). It can be said that in a range where the total capacitance of the ground capacitors C11 to C13 are is in range of a dozen pF to several thousand pF, as the total capacitance of the ground capacitors C11 to C13 increases, the rectified surge voltage increases and is in a range approximately from 900 to 1100V.

As will be understood when comparing FIGS. 2 and 3, if the total capacitance of the ground capacitors C11 to C13 increases, the noise terminal voltage decreases, but if the capacitance is increased too much, the rectified surge voltage increases as will be understood from FIG. 4. Accordingly, it can be said that the total capacitance of the ground capacitors C11 to C13 had should be selected so as to suppress the lightning surge voltage within a permissible range and to suppress the noise terminal voltage within a regulation range.

In one embodiment, f the total capacitance of the capacitors C11 to C13 is set to approximately ½₀₀₀ of the capacitance of the smoothing capacitor C3, or less in a case where the capacitance of the smoothing capacitor C3 is 1•F or less (for example, 0.23 to 0.47•F), the noise propagated to the input power-source line can be reduced to within a regulation range, and suppressing the lightning surge voltage (after rectification) within an acceptable range (around 1 kV) is also achieved.

In the present invention, the total capacitance of the ground capacitors C11 to C13 is not regulated as an absolute value but regulated as a relative value to the capacitance of the smoothing capacitor C3. The possibilities of variation of high frequency noise superimposed on the input power-source line because of a change of impedance to the high frequency noise, and variation of the surge voltage after rectification because of divided voltages to the ground capacitors C11 to C13 in a case where the capacitance of the smoothing capacitor C3 varies, have been considered. Because the ratio of the divided voltages to the lightning surge voltage can be regulated by regulating the total capacitance values of the ground capacities C11 to C13 relative to the capacitance of the smoothing capacitor C3, the influence of the change in capacitance of the smoothing capacitor C3 can be cancelled out.

Figure 5:
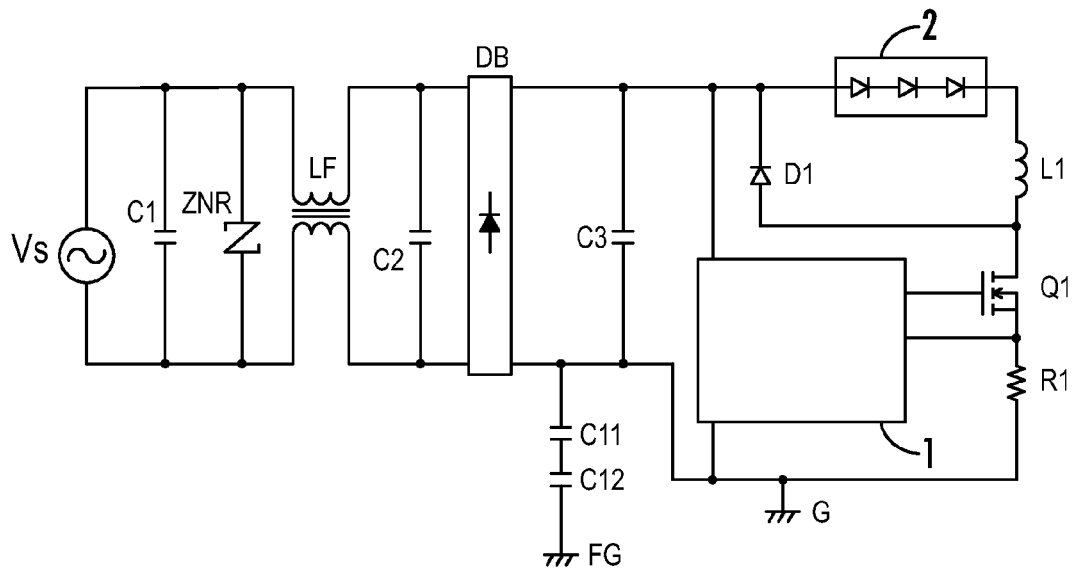
FIG. 5 is a circuit diagram according to a second embodiment of the present invention.

FIG. 5 is a circuit diagram according to a second embodiment of the present invention. Explanation of elements and functions similar to that of the first embodiment will be omitted. In the present embodiment, the negative electrode of the DC output terminal of the diode bridge DB is connected to circuit ground G and is further connected to the fixture ground FG via the series circuit of the capacitors C11 and C12. Also in this embodiment, if the total capacitance of the capacitors C11 and C12 is set to approximately 1/200 of the capacitance of the smoothing capacitor C3, or less in a case where the capacitance of the smoothing capacitor C3 is 1•F or less (for example, 0.23 to 0.47•F), the noise propagated to the input power-source line can be reduced within a regulation range while also suppressing lightning surge voltage.

Figure 6:
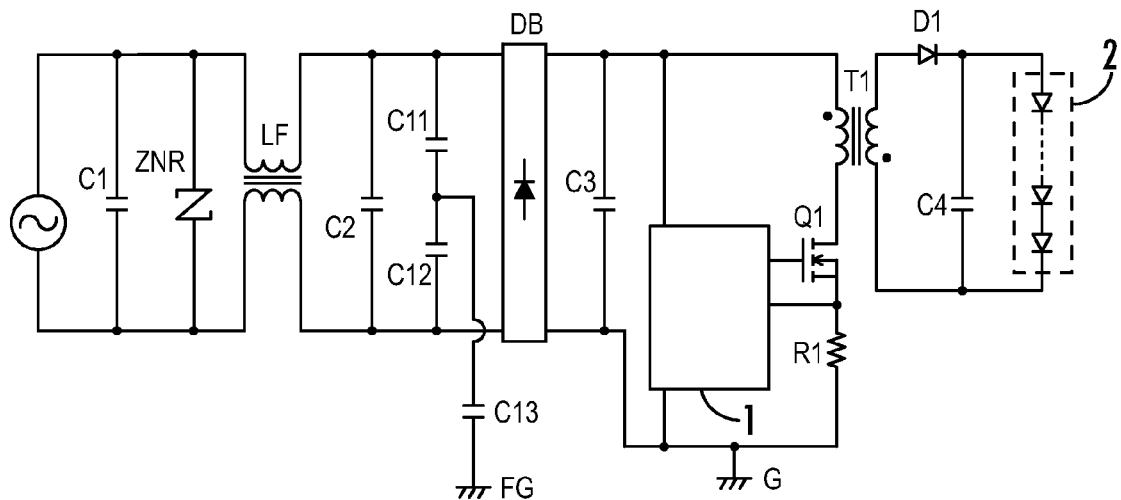
FIG. 6 is a circuit diagram according to a third embodiment of the present invention.

FIG. 6 is a circuit diagram according to a third embodiment of the present invention. In this embodiment, the DC-DC conversion circuit in the first embodiment is replaced by a step-down chopper circuit and is configured as a flyback converter circuit. The configuration and operation of a flyback converter circuit are commonly known.

When the switching element Q1 is in an on-state, current passes through a path from the smoothing capacitor C3, a primary winding of a transformer T1, the switching element Q1, the current detection resistor R1, and to the smoothing capacitor C3. During this time, the current passing through the primary winding of the transformer T1 gradually increases, and electromagnetic energy is stored the transformer T1. When the switching element Q1 is turned off, the electromagnetic energy stored in the transformer T1 is discharged through a path from a secondary winding of the transformer T1, the diode D1, the LED assembly 2, and to the secondary winding of the transformer T1. By repeating this operation at high frequency, the average current passing through the LED assembly 2 is controlled to a desired level. Meanwhile, a capacitor C4 is connected to the LED assembly 2 in parallel so that current can be supplied to the LED assembly 2 in a period when the diode D1 is in a shut-down state at a time when the switching element Q1 is in an on-state.

Also in this embodiment, if the total capacitance of the capacitors C11 to C13 is set to approximately 1/200 of the capacitance of the smoothing capacitor C3, or less in the case where the capacitance of the smoothing capacitor C3 is 1•F or less (for example, 0.23 to 0.47•F), the noise propagated to the input power-source line can be reduced within a regulation range while also suppressing lightning surge voltage.

Meanwhile, although not shown in the drawings, the DC-DC conversion circuit can be replaced by a step-down chopper circuit and is configured as a flyback converter circuit as in the second embodiment.

Figure 7:
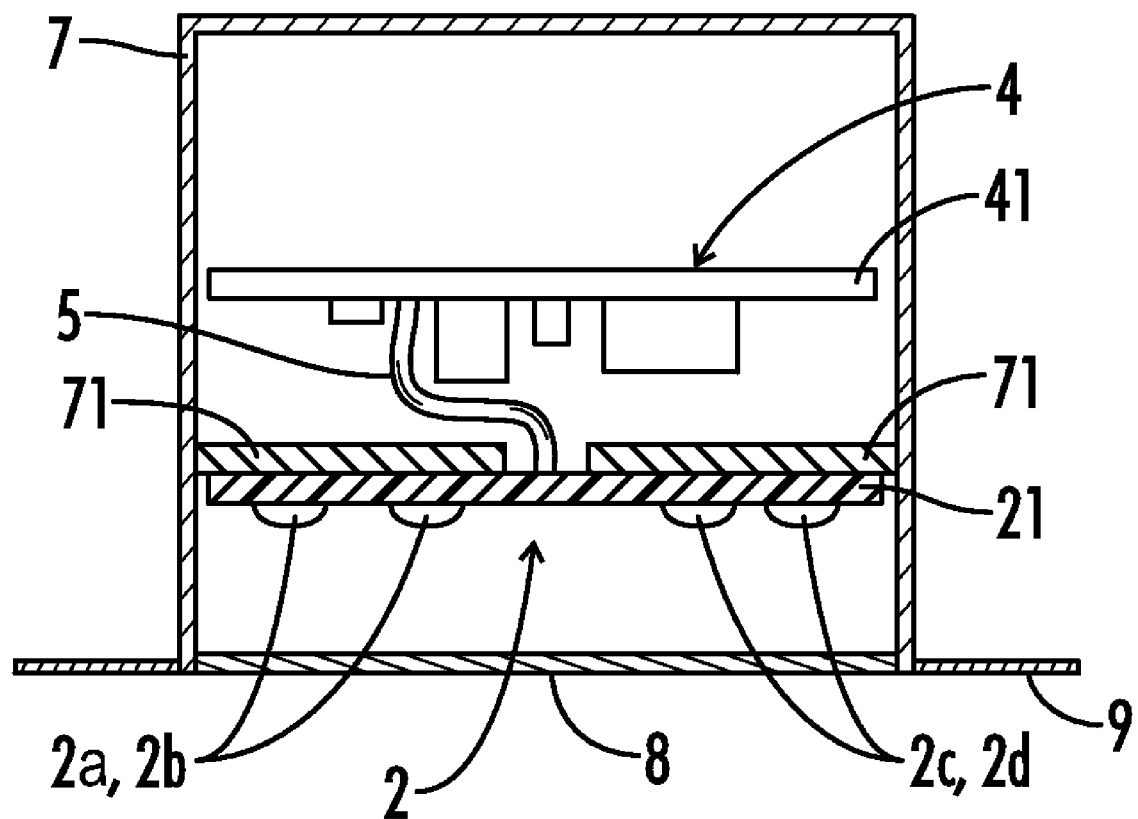
FIG. 7 is a cross-section view of a lamp fixture according to a fourth embodiment of the present invention.

FIG. 7 is a cross-section view of an LED lamp fixture using the LED power-source circuit according to any one of the embodiments. The fixture chassis or housing 7 of the LED lamp fixture is attached to or recessed into a ceiling 9. The LED assembly 2 and the power-source circuit part 4 are incorporated into the fixture housing 7. The fixture hosing 7 can be formed of a metallic cylindrical body having an opening lower end, and the opening lower end can be covered with a light diffusion plate 8. The LED assembly 2 is arranged so as to face the light diffusion plate 8. Component 21 represents an LED mounting board, and the LED mounting board mounts LEDs 2a to 2d of the LED assembly 2.

The LED assembly 2 includes four LEDs 2a to 2d in this embodiment, and has a configuration where the LEDs 2a to 2d are connected from anode to cathode in series. The respective LEDs 2a to 2d emit light by applying a positive voltage to the anode side of the LED 2a and a negative voltage to a cathode side of LED 2d. When a voltage equal to or larger than a total of forward direction voltages Vf of the LEDs 2a to 2d is applied, light is emitted from the LEDs depending on the current. Because the forward direction voltage Vf is approximately 3.5V generally, the LEDs can be turned on by a DC voltage of 4×3.5V, or more in the case where four LEDs are connected in series.

Component 41 represents a power-source circuit substrate. The e substrate 41 mounts electronic components of the power-source circuit 4. The LED assembly 2 is installed so as to contact to a heat radiator plate 71 in the fixture housing 7, so that heat generated by the LEDs 2a to 2d is released to the fixture housing 7. In addition, the LED assembly 2 and a lighting circuit 4 are connected by a lead line 5 via a hole provided in the heat radiator plate 71. The radiator plate 71 is a metal plate, for example, an aluminum plate, or a copper plate, and produces both a radiation effect and a heat shield effect. The radiator plate 71 is grounded by being electrically connected to the fixture housing 7, and the positive side and negative side of the lead line 5 are electrically separated.

Thus, although there have been described particular embodiments of the present invention of a new and useful LED Power-Source Circuit and Lamp Fixture, it is not intended that such references be construed as limitations upon the scope of this invention except as set forth in the following claims.

What is claimed is:

1. An LED power circuit comprising:
    an input filter circuit including at least a noise prevention capacitor and a line filter;
    a diode bridge having an input side electrically coupled to the input filter circuit and having an output side;
    a smoothing capacitor electrically coupled to the output side of the diode bridge and having a capacitance of 1 μF or less;
    a DC-DC conversion circuit electrically coupled across the smoothing capacitor and having an output side;
    an LED assembly connected to the output side of the DC-DC conversion circuit;
    a grounding capacitance circuit is coupled to ground from an input power-source line between the line filter and the diode bridge, said grounding capacitance circuit comprising first and second grounding capacitors coupled in series between the input power-source line and a circuit ground, and a third grounding capacitor coupled on a first end to a node between the first and second grounding capacitors and coupled on a second end to earth ground; and
    wherein a total combined capacitance of the first, second and third grounding capacitors is substantially 1/200 or less of that of a capacitance of the smoothing capacitor.

2. The LED power circuit of claim 1, wherein the DC-DC conversion circuit is a step-down chopper circuit.

3. The LED power circuit of claim 1, wherein the DC-DC conversion circuit is a flyback converter circuit.

4. A lamp fixture comprising:
a lamp housing;
an LED power circuit positioned in the lamp housing;
an LED assembly connected to the lamp housing and electrically coupled to the LED power circuit;
the LED power circuit comprising
- an input filter circuit including at least a noise prevention capacitor and a line filter,
- a diode bridge having an input side electrically coupled to the input filter circuit and having an output side,
- a smoothing capacitor electrically coupled to the output side of the diode bridge and having a capacitance of 1 µF or less,
- a DC-DC conversion circuit electrically coupled across the smoothing capacitor and having an output side;
the LED assembly connected to the output side of the DC-DC conversion circuit;
a grounding capacitance circuit is coupled to ground from an input power-source line between the line filter and the diode bridge, said grounding capacitance circuit comprising first and second grounding capacitors coupled in series between the input power-source line and a circuit ground, and a third grounding capacitor coupled on a first end to a node between the first and second grounding capacitors and coupled on a second end to a fixture ground,
wherein a total capacitance of the grounding capacitor from the power-source line to fixture ground is substantially $1/200$ or less of that of a capacitance of the smoothing capacitor.

5. The lamp fixture of claim 4, wherein the DC-DC conversion circuit is a step-down chopper circuit.

6. The lamp fixture of claim 4, wherein the DC-DC conversion circuit is a flyback converter circuit.

* * * * *